US008538787B2

(12) United States Patent
Braun et al.

(10) Patent No.: US 8,538,787 B2
(45) Date of Patent: Sep. 17, 2013

(54) IMPLEMENTING KEY PERFORMANCE INDICATORS IN A SERVICE MODEL

(75) Inventors: Alan D. Braun, Morris Plains, NJ (US); Isaac J. Graf, Flushing, NY (US); Shoel D. Perelman, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 1365 days.

(21) Appl. No.: 11/764,497

(22) Filed: Jun. 18, 2007

(65) Prior Publication Data

US 2008/0312986 A1 Dec. 18, 2008

(51) Int. Cl.
*G06Q 10/00* (2012.01)
(52) U.S. Cl.
USPC ........ 705/7.11; 705/7.12; 705/7.23; 709/224; 370/230; 370/252
(58) Field of Classification Search
None
See application file for complete search history.

(56) References Cited

U.S. PATENT DOCUMENTS

| | | | |
|---|---|---|---|
| 7,269,569 B2 * | 9/2007 | Spira et al. .................. 705/7 |
| 7,313,568 B2 * | 12/2007 | Cutlip et al. ..................... 1/1 |
| 7,739,136 B2 * | 6/2010 | Chang et al. .................. 705/7 |
| 2002/0035495 A1 * | 3/2002 | Spira et al. .................. 705/7 |
| 2002/0049687 A1 * | 4/2002 | Helsper et al. .................. 706/45 |
| 2002/0099578 A1 * | 7/2002 | Eicher et al. .................. 705/7 |
| 2002/0099579 A1 * | 7/2002 | Stowell et al. .................. 705/7 |
| 2002/0099580 A1 * | 7/2002 | Eicher et al. .................. 705/7 |
| 2002/0099598 A1 * | 7/2002 | Eicher et al. .................. 705/11 |
| 2003/0149578 A1 * | 8/2003 | Wong .................. 705/1 |
| 2005/0010456 A1 * | 1/2005 | Chang et al. .................. 705/7 |
| 2005/0223020 A1 * | 10/2005 | Cutlip et al. .................. 707/102 |
| 2006/0009991 A1 * | 1/2006 | Jeng et al. .................. 705/1 |
| 2006/0111921 A1 * | 5/2006 | Chang et al. .................. 705/1 |
| 2006/0123022 A1 * | 6/2006 | Bird .................. 707/100 |
| 2006/0153090 A1 * | 7/2006 | Bishop et al. .................. 370/252 |
| 2007/0006278 A1 * | 1/2007 | Ioan Avram et al. .............. 726/1 |
| 2008/0021994 A1 * | 1/2008 | Grelewicz et al. ............ 709/224 |
| 2008/0071589 A1 * | 3/2008 | Laicher .................. 705/7 |
| 2008/0281660 A1 * | 11/2008 | Sajja et al. .................. 705/8 |

OTHER PUBLICATIONS

Christian Gheorghe. (May 2006 ). Predictive Analytics: BPM Drives the Dynamic Organization. Business Performance Management Magazine, 4(2), 21-23.*
Jennifer Cannell. (Apr. 2006). Utilizing Dashboards for Performance Management. Credit & Financial Management Review, 12(2), 33-40.*
Maqsood A Sandhu, & A Gunasekaran. (2004). Business process development in project-based industry: A case study. Business Process Management Journal, 10(6), 673-690.*
Verena Dziobaka-Spitzhorn. (2006). From West to East: How the World's Third Largest Retailer Drives Its Global Expansion. Performance Improvement, 45(6), 41-48.*

(Continued)

Primary Examiner — Gurkanwaljit Singh

(57) ABSTRACT

A service model of resources is created and the resources are mapped to a plurality of templates. The service model represents real-time characteristics of resources for an enterprise. Rule-based Key Performance Indicators (KPIs) are then configured on the templates and thereby applied to the depicted resources, and the overall health of the system that utilizes the depicted resources depicted is determined. These KPI's can be chained in a way that allows the user a large amount of flexibility to report the metrics most relevant to the health of the business.

20 Claims, 10 Drawing Sheets

(56) References Cited

OTHER PUBLICATIONS

Walden, Mark. (1996). How to evaluate and improve a forecasting process. The Journal of Business Forecasting Methods & Systems, 15(2), 22.*

Konrad Saur. (Dec. 2003). Life Cycle Management as a Business Strategy for Sustainability. Environmental Progress, 22(4), 237-240.*

Jinhong Xie, X Michael Song, Marvin Sirbu, & Qiong Wang. (1997). Kalman Filter estimation of new product diffusion models. JMR, Journal of Marketing Research, 34(3), 378-393.*

Robert Fildes. (1983). An Evaluation of Bayesian Forecasting :Abstract. Journal of Forecasting (pre-1986), 2(2), 137.*

Pan, Rong (2002). Statistical process adjustment methods for quality control in short-run manufacturing. Ph.D. dissertation, The Pennsylvania State University, United States—Pennsylvania.*

Deng, Yan K. Cathey (2002). Monitoring process and assessing uncertainty for ANFIS time series forecasting. Ph.D. dissertation, West Virginia University, United States—West Virginia.*

Rajendra P. Srivastava, & Liping Liu. (2003). Applications of Belief Functions in Business Decisions: A Review. Information Systems Frontiers: Special Issue: Business Applications of Uncertain Reasoning, 5(4), 359-378.*

Horvitz, E. "Coordinate: Probabilistic Forecasting of Presence and Availability", Proceedings of the 18th Conference on Uncertainty and Artificial Intelligence, Edmonton Alberta, Jul. 2002. Morgan Kaufmann Publishers, pp. 224-233.*

Venkatraman, N. (1997). Beyond outsourcing: Managing IT resources as a value center. Sloan Management Review, 38(3), 51-64.*

Boley, Daniel, Vivian Borst, and Maria Gini. "An unsupervised clustering tool for unstructured data." IJCAI 99 Int'l Joint Conf. on Artificial Intelligence. 1999.*

Karypis, George. "Evaluation of Item-Based Top-N Recommendation Algorithms." (2000).*

Tokunaga, Makoto Iwayama Takenobu. "Cluster-based text categorization: a comparison of category search strategies." ACM SIGIR conference on research and development in information retrieval: proceedings. ACM Press, 1995.*

* cited by examiner

| RESOURCE | KPI | ACTUAL PERFORMANCE | VISUAL CODE |
|---|---|---|---|
| APPLICATION | 100 | 78 | |
| PROCESS | 100 | 50 | |
| DATABASE | 100 | 125 | |

IMPLEMENTING KEY PERFORMANCE INDICATORS IN A SERVICE MODEL

BACKGROUND OF THE INVENTION

The present disclosure relates to the field of computers, and specifically to software. Still more specifically, the present disclosure relates to dynamically creating a service model of computing resources.

Enterprises utilize many resources, including computing resources. Often, such resources are layer dependent. For example, a particular software application may support the needs of a particular enterprise department, while hardware resources such as a server farm may support the execution of the particular software application.

BRIEF SUMMARY OF THE INVENTION

A service model is created for depicting an enterprise's resources. The service model may be created dynamically via lookups into external data sources, or statically through a user interface or scripts. The resources in the service model are assigned to templates. The templates contain a plurality of rules that are used to define KPIs (Key Performance Indicators) that are used to report performance levels of the resources. These rules can be chained in a way that allows the user to easily configure any propagation logic that will most effectively report the health of the resources in the service model.

The above as well as additional objectives, features, and advantages of the present invention will become apparent in the following detailed written description.

BRIEF DESCRIPTION OF THE SEVERAL VIEWS OF THE DRAWINGS

The invention itself will best be understood by reference to the following detailed description of an illustrative embodiment when read in conjunction with the accompanying drawings, wherein:

FIG. 8 depicts an exemplary real-time scorecard depicting how an enterprise's resources, which are depicted at different nodes in the service model, are performing relative to Key Performance Indicators (KPIs) for the enterprise's resources.

DETAILED DESCRIPTION OF THE INVENTION

Figure 1:
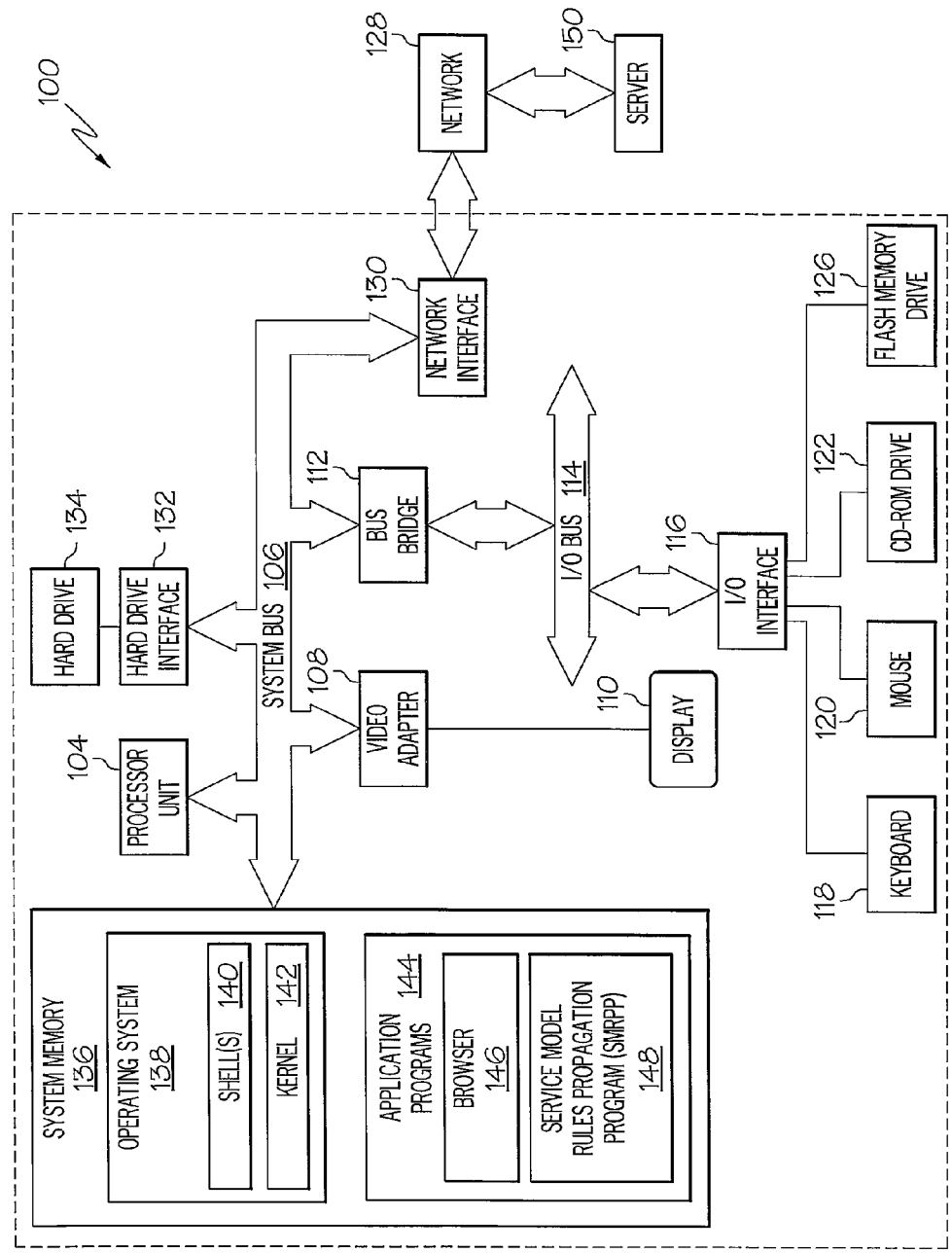
FIG. 1 depicts an exemplary computer in which the present invention may be implemented.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatuses (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

With reference now to FIG. 1, there is depicted a block diagram of an exemplary computer 100, with which the present invention may be utilized. Computer 100 includes a processor unit 104 that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Compact Disk—Read Only Memory (CD-ROM) drive 122, and a flash memory drive 126. The format of the ports connected to I/O interface 116 may be any known to those skilled in the art of computer architecture, including but not limited to Universal Serial Bus (USB) ports.

Computer 100 is able to communicate with a server 150 via a network 128 using a network interface 130, which is coupled to system bus 106. Network 128 may be an external network such as the Internet, or an internal network such as an Ethernet or a Virtual Private Network (VPN). Server 150 may be architecturally configured in the manner depicted for computer 100.

A hard drive interface 132 is also coupled to system bus 106. Hard drive interface 132 interfaces with a hard drive 134. In one embodiment, hard drive 134 populates a system memory 136, which is also coupled to system bus 106. System memory 136 is defined as a lowest level of volatile memory in computer 100. This volatile memory may comprise additional higher levels of volatile memory (not shown), including, but not limited to, cache memory, registers, and buffers. Code that populates system memory 136 includes an operating system (OS) 138 and application programs 144.

OS 138 includes a shell 140, for providing transparent user access to resources such as application programs 144. Generally, shell 140 (as it is called in UNIX®) is a program that provides an interpreter and an interface between the user and the operating system. Shell 140 provides a system prompt, interprets commands entered by keyboard 118, mouse 120, or other user input media, and sends the interpreted command(s) to the appropriate lower levels of the operating system (e.g., kernel 142) for processing. As depicted, OS 138 also includes kernel 142, which includes lower levels of functionality for OS 138. Kernel 142 provides essential services required by other parts of OS 138 and application programs 144. The services provided by kernel 142 include memory management, process and task management, disk management, and I/O device management.

Application programs 144 include a browser 146. Browser 146 includes program modules and instructions enabling a World Wide Web (WWW) client (i.e., computer 100) to send and receive network messages to the Internet. Computer 100 may utilize HyperText Transfer Protocol (HTTP) messaging to enable communication with server 150. Application programs 144 in system memory 136 also include a Service Model Rules Propagation Program (SMRPP) 148. SMRPP 148 performs the functions illustrated below in FIGS. 2-9, and may include software components of the Service Model Construction Logic 304, Business Impact Analysis logic 320, performance logic 322, visual coding logic 324, rule propagation logic 326, and Key Performance Indicator (KPI) logic 328 shown below in FIG. 3.

The hardware elements depicted in computer 100 are not intended to be exhaustive, but rather represent and/or highlight certain components that may be utilized to practice the present invention. For instance, computer 100 may include alternate memory storage devices such as magnetic cassettes, Digital Versatile Disks (DVDs), Bernoulli cartridges, and the like. These and other variations are intended to be within the spirit and scope of the present invention.

Figure 2:
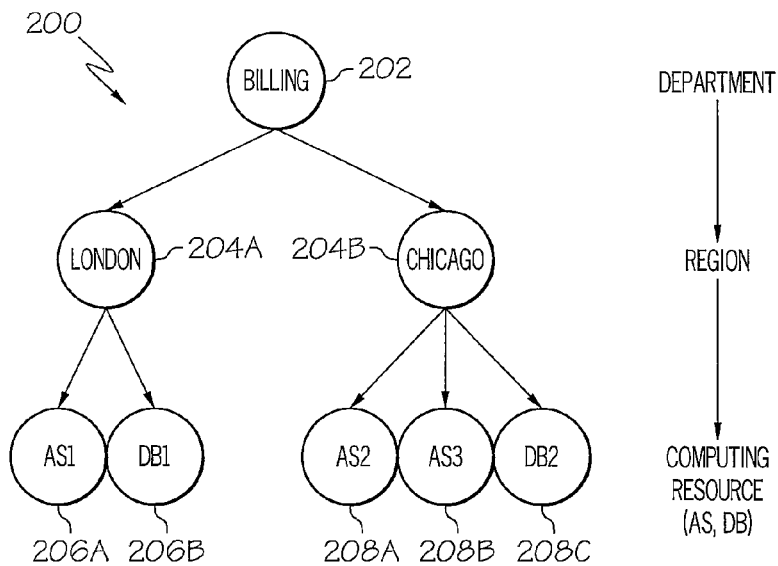
FIG. 2 illustrates a relationship among resources depicted in a service model that has been constructed in accordance with the present disclosure.

With reference now to FIG. 2, a service model 200, which is constructed in accordance with the process described herein, is depicted. Service model 200 includes multiple layers of resources, including those shown for exemplary purposes as a department level, a region level, and a computing resources level. The department level includes a billing department 202, which has offices in the London region (204a) and the Chicago region (204b). Each department and region can be quantified (e.g., through performance data such as sales figures, customer satisfaction levels, etc.) for creation of the service model 200. As depicted, London region 204a has access to an Application Server (AS1) 206a and a Database (DB1) 206b. Similarly, the Chicago region has access to two Application servers (AS2-208a; AS3-208b) and a database (DB2-208c).

The relationship between the departments, regions and computing resources are depicted in tables 210, 212 and 214. These tables may be stored in data sources, such as the data sources 318 describe below in FIG. 3.

Figure 3:
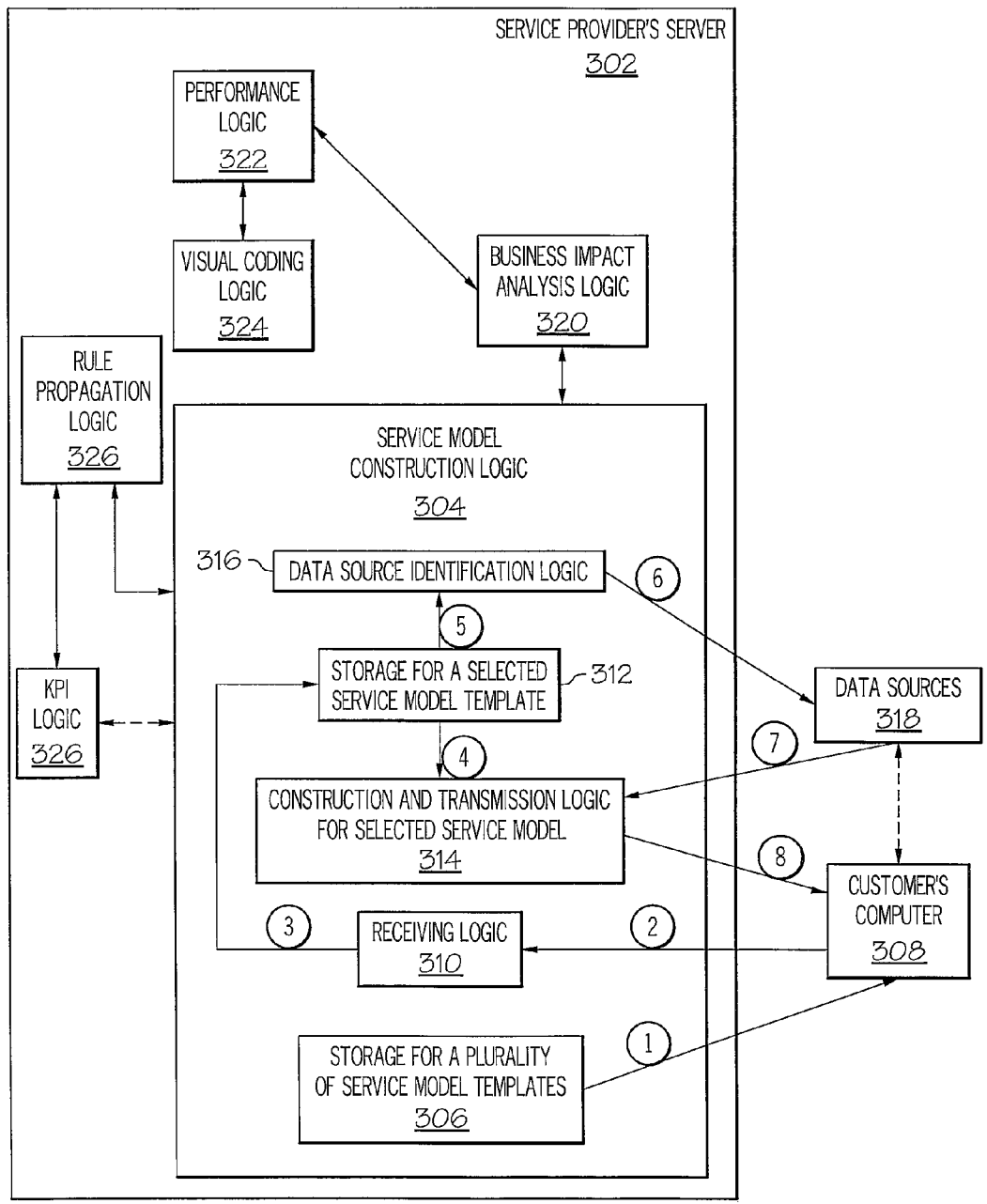
FIG. 3 depicts logic found within a service model construction logic that is used to construct the service model depicted in FIG. 2.

Referring now to FIG. 3, a relationship among a service provider's server 302, data sources 318 and a customer's computer 308 is depicted. Also depicted is an exemplary set of steps that are taken to create a service model in accordance with the present disclosure.

Within the service provider's server 302 is a service model construction logic 304. Service model construction logic 304 includes a storage 306, which holds a plurality of service model templates. These service model templates provide a general organizational framework for describing a relationship among resources, including computing resource, departments, personnel, etc., for an enterprise. Each service model template may include a set of rules that map resources belonging to the template to one or more external data sources. Similarly, each service model template may include a set of rules that define a dependency relationship (e.g., parent, child) between two or more depicted resources. Note also that a single resource may be part of many different service model templates. Some or all of these templates are sent to the customer's computer 308 (Step 1). The customer (or intelligent software logic within customer's computer 308) selects one or more of the service model templates, and sends the selected service model template(s) to a receiving logic 310 within the service model construction logic 304 (Step 2). The selected service model template is then sent to a storage 312 (Step 3), which forwards the selected service model template to a construction and transmission logic 314 (Step 4) and a data source identification logic 316 (Step 5). The data source identification logic 316 polls an appropriate data source from the data sources 318 (Step 6), and the requisite data is then sent to the construction and transmission logic 314 (Step 7). The construction and transmission logic 314 then creates a service model that accurately represents the resources of the customer, and sends this newly created service model to the customer's computer 308 (Step 8). Note that the construction and transmission logic 314 can cache data for the newly created service model, such that sections of the newly created service model can be re-created on-the-fly for transmission to the customer.

A business impact analysis logic 320 can analyze the health of an enterprise's resources by using the newly created service model. For example, a performance logic 322 can compare how well a resource is or is not performing when compared to a predefined benchmark, which is found in the data sources 318. In one embodiment, these data sources 318 are a Configuration Management Database (CMDB) that may be (as suggested by the dotted line) directly managed by the customer using the customer's computer 308. These benchmarks, as well as other data needed to define the operation, relationship to other resources, and other parameters for describing a particular resource may be obtained by a Structured Query Language (SQL) query from the service model construction logic 304 to the CMDB data sources 318. Alternatively, the external data source may be from a web service. In either scenario, logic (e.g., data source identification logic 316) configures a policy that obtains both children and/or parents of seed data sources, rather than simply making a standard database query. As described in FIG. 5, each depicted resource can be visually coded (e.g., color coded, shaded, etc.) to indicate how well it is performing.

Note also that service provider's server 302 can include logic for propagating rules between levels in the service model (through the use of a rule propagation logic 326) as well as logic for assigning Key Performance Indicators (KPIs) and describing the relationship between a KPI and a particular resource (through the use of a KPI logic 326). Additional details of rule propagation and KPI usage are provided below in FIGS. 6A-9. Note that a KPI is simply a special type of rule, which, for purposes of the present disclosure, can be categorized in two types: numeric and threshold status. Numeric rules are rules that require a specific performance value, while threshold status rules are rules which categorize performance according to ranges.

Figure 4:
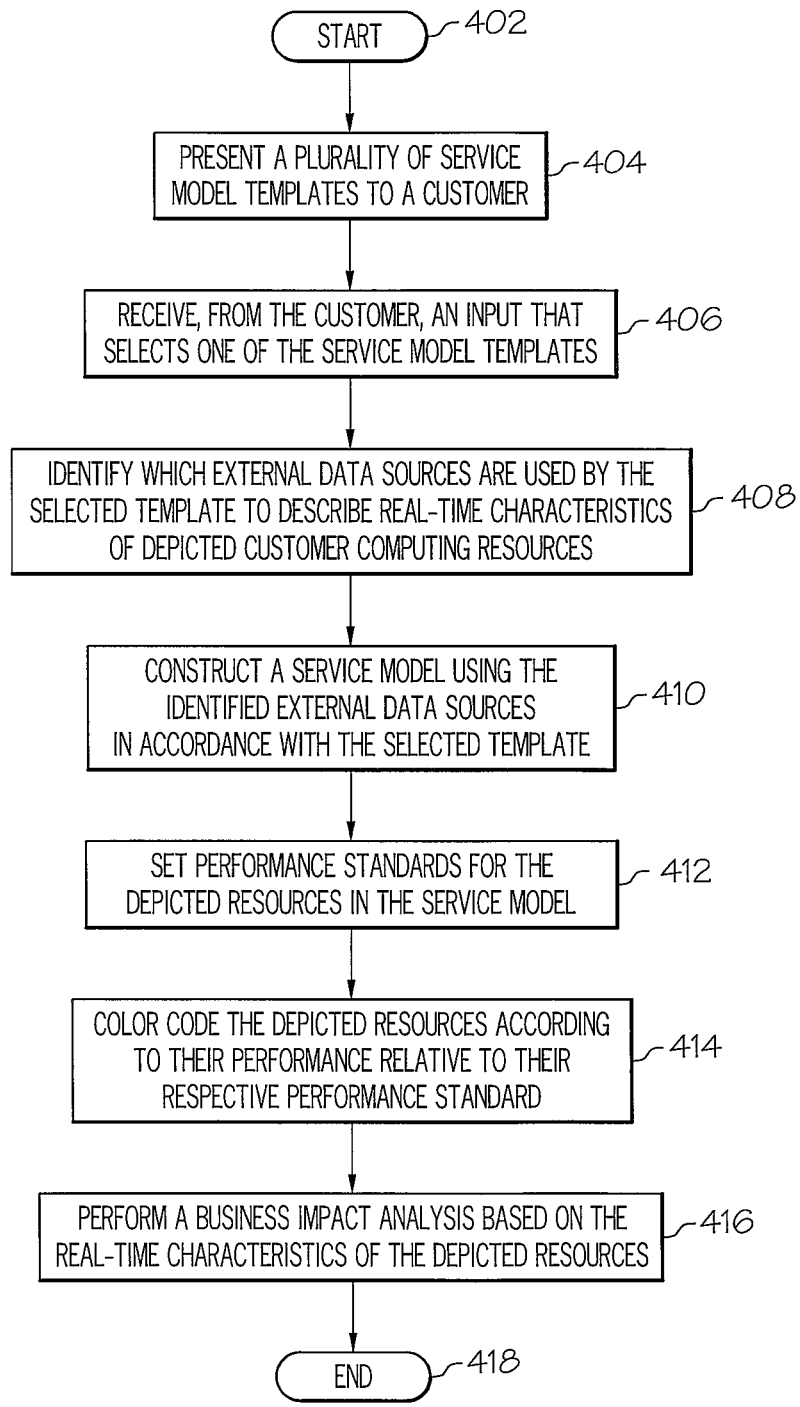
FIG. 4 is a flow-chart of exemplary steps taken to construct the service model shown in FIG. 2.
Figure 5:
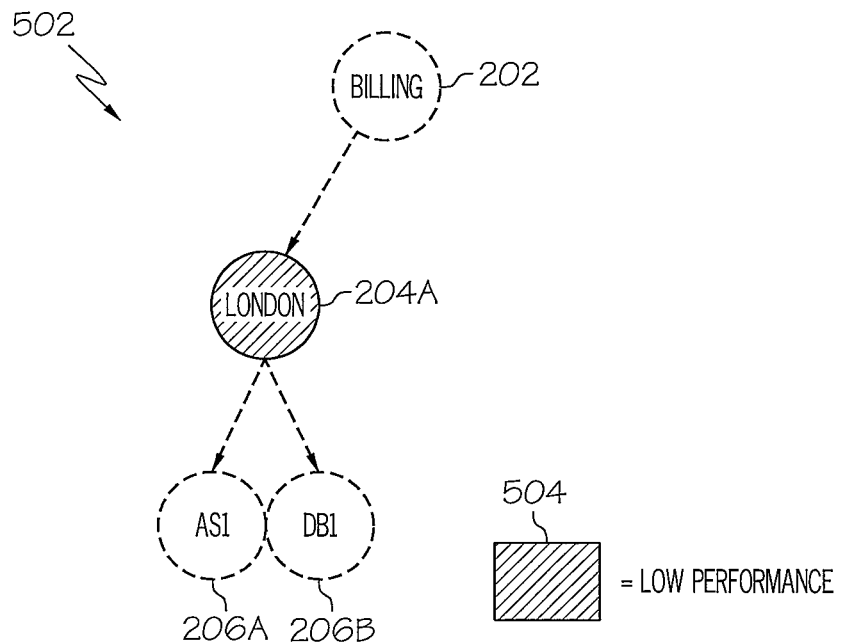
FIG. 5 depicts a service model having visually-coded nodes based on a represented resource's performance relative to a Key Performance Indicator (KPI) that has been propagated to the node in a manner described in FIG. 6A-9.
Figure 5:
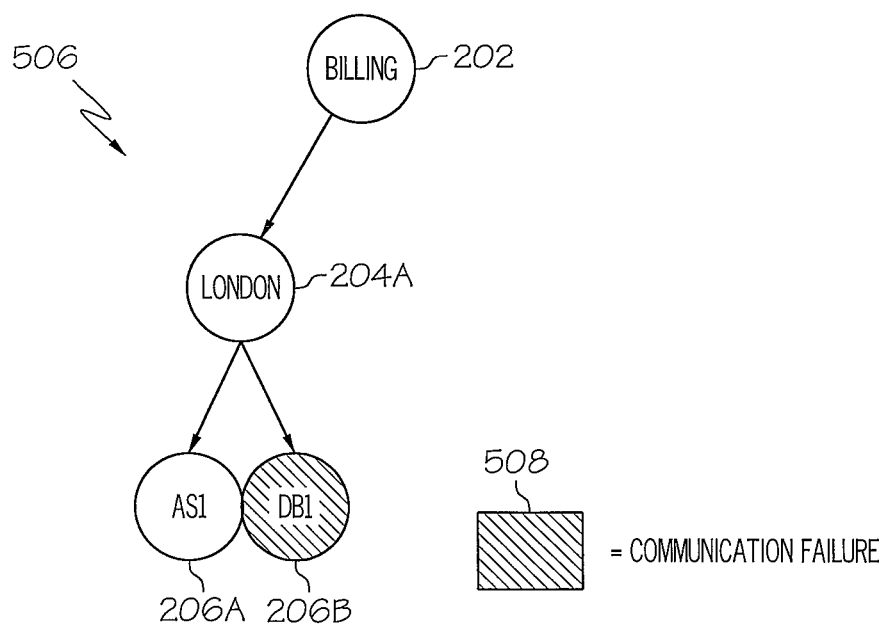

A more detailed description of the process described in FIG. 3 is shown in the flow-chart of FIG. 4. After initiator step 402, which may be prompted by a message from a customer's computer asking that a service model of the customer's resources be created, a plurality of service model templates are presented to the customer (block 404). The customer selects which service model template(s) he wants (block 406), which allows the service provider to identify which external data sources are needed to describe real-time characteristics of the resources to be depicted in a newly created service model for the customer (block 408). The service model is created (block 410), showing all resources described by the identified external data sources. Note that the steps shown in block 404-410 are exemplary steps taken in one embodiment of the present invention. In another embodiment, the service model can be created via user inputs into a Graphical User Interface (GUI), scripted instructions (e.g., using Structured Query Language or similar language scripts), etc.

As depicted in block 412, performance standards for each resource depicted in the service model may be set. These performance standards may be for software (e.g., error rates, throughput, etc.), hardware (e.g., processing times, memory page faults caused by needed data not being stored in cache, etc.) or personnel (e.g., excessive absenteeism, failure to meet sales quotas, etc.). If a resource meets, exceeds, or fails to meet a predetermined performance standard, this condition can be represented by visually coding the particular resource's depiction in the service model (block 414). Utilizing such visual coding is useful to a manager, or a performance software, when performing a business impact analysis based on the performance of various depicted enterprise resources (block 416). The process ends at terminator block 418.

Different resources may be hidden if they, or their seed resource, are functioning within normal parameters, or if the seed resource has not been called for a specified period of time. For example, consider the partial service model 502 shown in FIG. 5. Initially, only the resource 204a, which depicts the London office of the billing department is shown in a Graphical User Interface (GUI) on a display (e.g., display 110 shown in FIG. 1) of the customer's computer (e.g., customer's computer 308 shown in FIG. 3). As suggested by legend 504, the London office is performing poorly. Initially, the parent department (billing 202) and the computing resources (206a-b) are not depicted in the GUI. However, by clicking on the depiction of the London office (204a), the parent department (billing 202) and the computing resources (206a-b) are displayed. As suggested by legend 508, the problem appears to be caused by a communication failure between the London office 204a and the Database DB1 (206b). A manager (or automatic software logic) can then take the appropriate steps to correct the problem. Note that the visual coding may be based on scoring data, which can be viewed independently of the visual coding in a table form, in order to provide the evaluator additional information regarding the cause of the low performance of the London office.

Note again that the initial presentation of the London office (204a) may be in response to an anomaly (i.e., under-performance, over-performance, etc.), or a manager may simply call up the desired resource (seed resource) to see how its parent(s) and children are behaving.

Note also that in one embodiment, the grading of a particular resource's performance is via rules propagation and the use of KPIs, as described below.

Figure 6A:
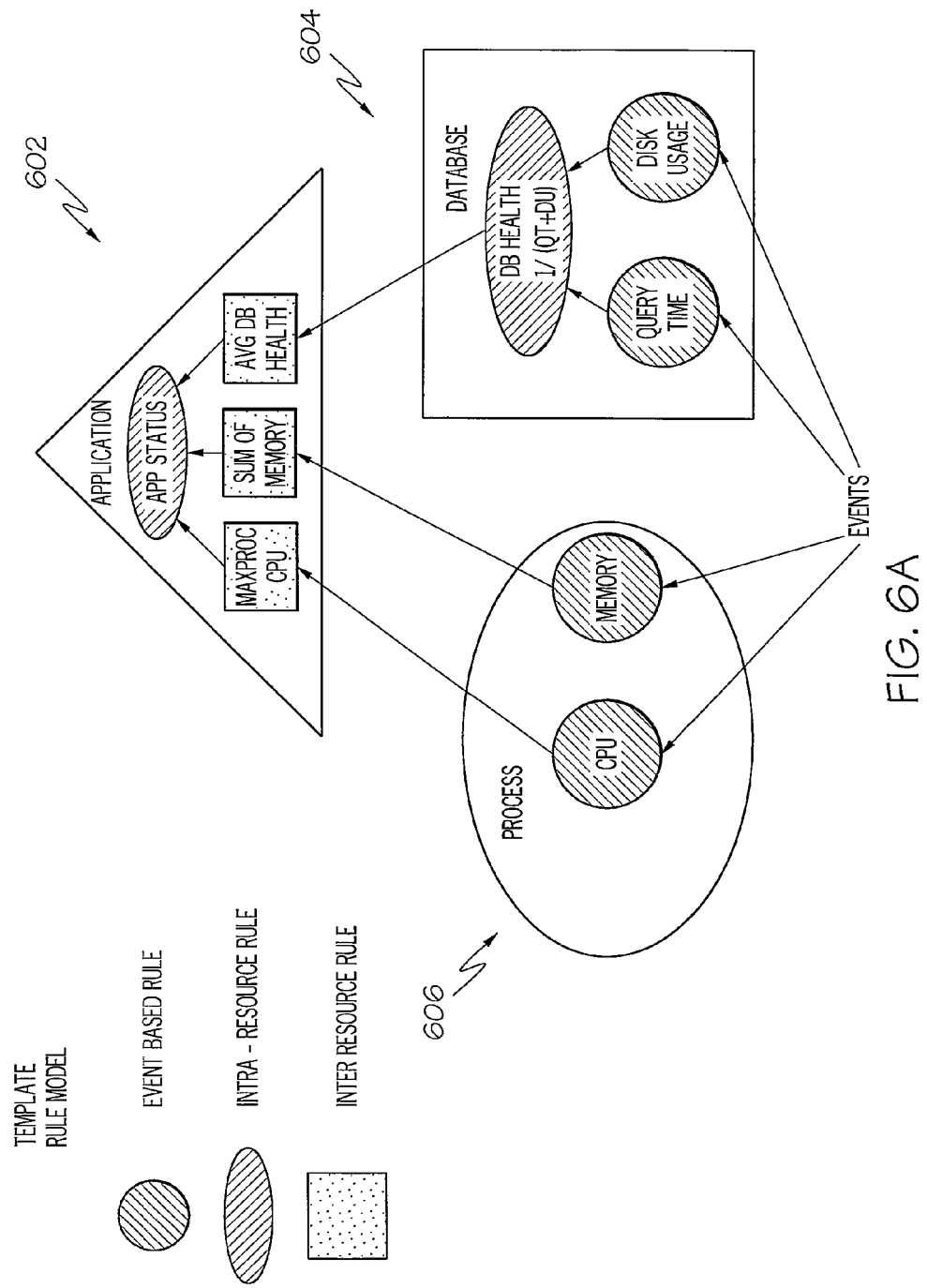
FIG. 6A depicts a relationship among rules in different levels of a service model such as that depicted in FIG. 5.

With reference now to FIG. 6A, an exemplary representation of how rules and KPIs pertain to the present process is presented. First, however, an overview of rules and KPIs is presented.

Recall that nodes in the service model represent resources (hardware, software, and human) that belong to or are accessible to an enterprise. A rule is defined as a calculation that determines a performance property of a resource. For example, a rule for a server may calculate its response time, a rule for a set of web servers may calculate an average response time, a rule for a software application may calculate how often the software crashes, and a rule for a human resource may calculate how many customer complaints are received. The result of such calculations ultimately result in a performance indicator value (scalar), which if important (e.g., "mission critical"), will be a Key Performance Indicator (KPI).

There are three main types of rules.

The first type of rule is the "event-based" rule. This rule is triggered by an event, which may be a fault event such as a slowdown in hardware or software functioning, an excessive number of trouble tickets for a service, a page fault, a total computer failure, a power outage, etc., or a useful event, such as a computer performing above its design parameters, software running extra fast, a division having fewer complaints than expected, etc. Inputs for an event-based rule can be filtered. For example, hardware and/or software filters can input events to a rule in a depicted resource (in the service model) that only are relevant to a particular computer, fall outside some pre-determined performance parameter, etc., in order to expedite the execution of a rule. Event-based rules are stand-alone rules, since they do not rely on any other rule to execute.

A second type of rule is an intra-resource rule. As the name indicates, an intra-resource rule depends on a plurality of other rules, wherein the other rules are within the same resource. Thus, two rules can operate together (asynchronously, wherein one rule uses the output of another rule, or synchronously, wherein the two rules execute together). This permits a calculation based on multiple rules within a same resource. Inter resource rules can perform any custom computation across other rules in templates to which the instance belongs or it can invoke a configurable policy script to provide an extra layer of configurable logic to do the computation.

The third type of rule is an inter-resource rule, in which a rule in one resource depends on the output of a rule in another resource. These rules perform the job of aggregating the values of specified rules and propagating the result to parent resources that depend on the lower level resources. Examples of inter-resource rules include averaging the value of a rule of child resources, determining the maximum, minimum, or sum of the values of the child resources. These rules can also invoke configurable policies to execute arbitrary logic to perform the KPI calculation. The policies can be configured to access external databases, make web services calls, and query other areas of the service model to obtain whatever data is necessary to compute the KPIs.

Note that each rule can have an importance value applied to it, such that rules that are more important have higher importance values for weighing, scoring, etc.

Consider now FIG. 6A. This figure depicts an example of how a customer might configure templates and chain the KPI's in these templates to model their business services. An application (modeled with the Application template) 602 includes an intra-resource rule ("AppStatus"—Application Status). This rule depends on two inter-resource rules ("Max-Proc CPU"—Maximum CPU utilization of any single process comprising the application; "SumOf Memory"—How much total memory is being utilized by all components of the application; and "AvgDB Health"—the average score of the health of databases used by the application). (Note that these inter-resource rules will have their values depend on the values of rules inside the child resources of the application parent).

Similarly, the Database template that models a database 604 has two event-based rules ("Query time"—the average length of time needed to access data in response to a database query; "disk usage"—the amount of disk space used by the database 604). These event-based rules provide inputs ("QT" for Query Time and "DU" for Disk Usage) to the intra-resource rule DB Health. This intra-resource rule provides an input to the inter-resource rule "AvgDB Health" found in the application 602.

Process 606, which is a thread or similar component of the application 602, includes two event-based rules ("CPU"—Central Processing Unit utilization rate; "Memory"—amount of system memory used by a process on a computer). These two event-based rules provide an input to the inter-resource rules ("MaxProc CPU" and "SumOf Memory") found in the application 602.

Figure 7:
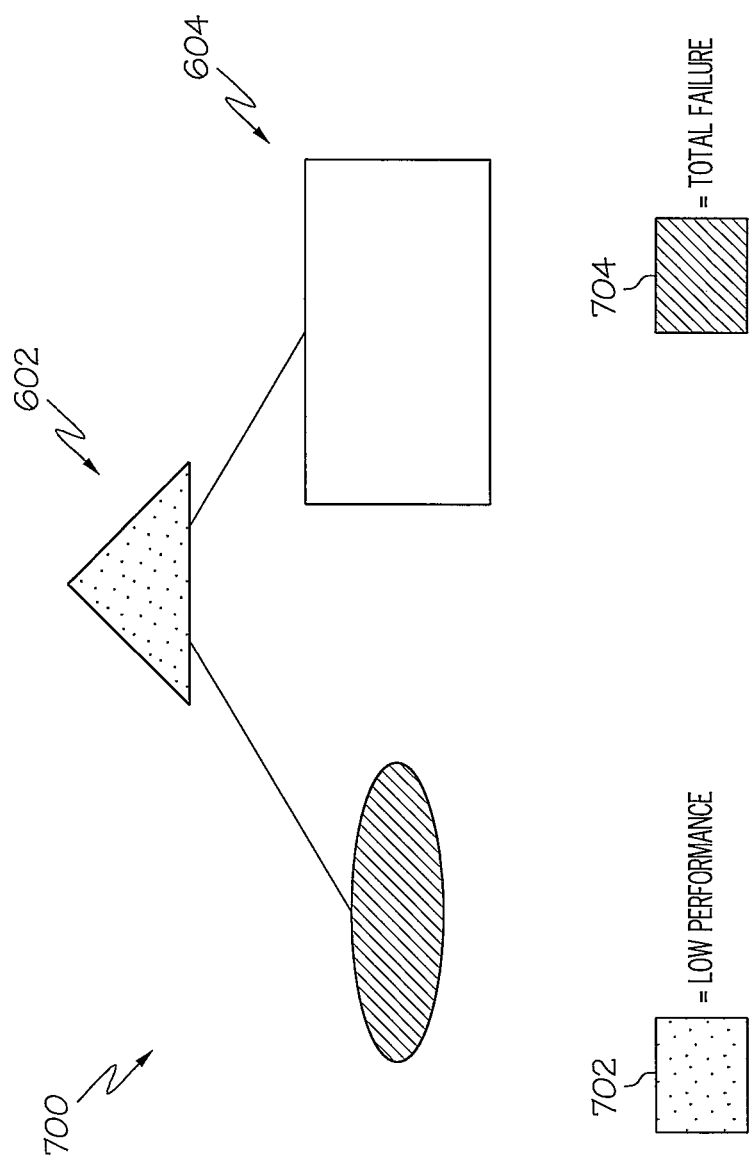
FIG. 7 illustrates a visually coded service model that describes performance levels of different resources.

Based on the inputs and outputs to and from the rules depicted in FIG. 6A, status can be assigned and propagated for KPI's in a service model, such as service model 700 shown in FIG. 7. The rules described in FIG. 6A can enable a service model to be visually-coded (e.g., color-coded) in a manner that permits rapid assessment of resources that are navigated to in a manner described above. Thus, the application 602 is visually described as performing below nominal (as suggested by the legend 702), perhaps because the process 606 has totally failed (as suggested by legend 704).

Alternatively, these resources can be displayed in a chart form, such as the chart 800 shown in FIG. 8. Note that such a chart offers both the advantage of a quick visual overview (under the "Visual coding" column) as well as detailed information (comparing actual performance scalars with KPI standards).

Figure 6B:
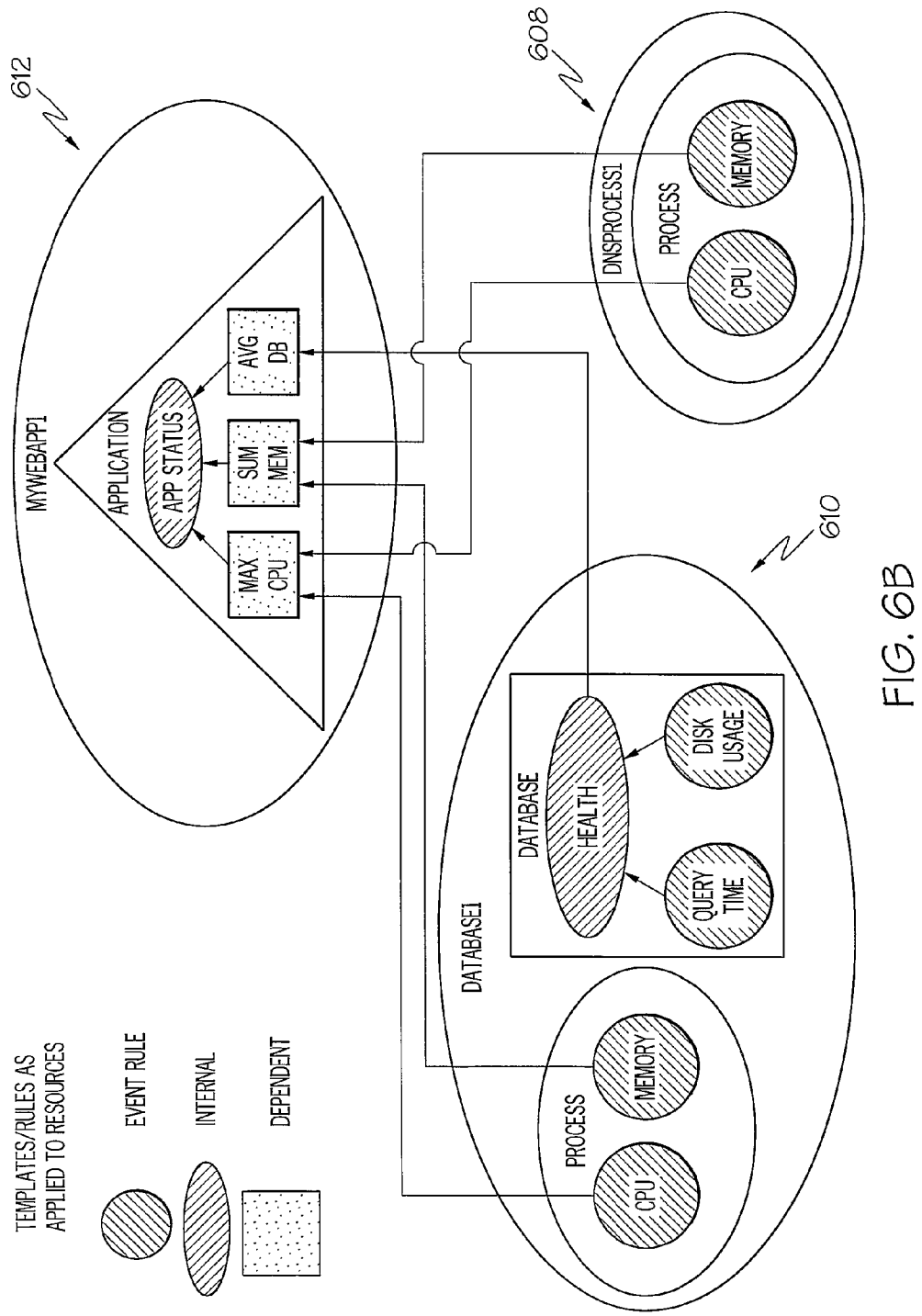
FIG. 6B illustrates an exemplary utilization of templates and rules when applied to web resources.

Referring now to FIG. 6B, an example is presented that shows how the templates, which were used to create the resource depictions shown in FIG. 6A, can be applied to a small service model. The "dnsprocess1" resource (resource 608) depiction is created using the Process template described above, the "database1" resource (resource 610) depiction is created using both the Database template and the Process template (since a database instance described as resource 610 is both a process and a database), and the "MyWebApp1" resource depiction (resource 612) uses the Application template. The "MyWebApp1" resource 612 depends on the "dnsprocess1" resource 608 and the "database1" resources 610. Due to the KPI propagation logic that has been configured (see FIG. 6A), when events come in to the system that specify current values of the event-based rules for the resources (CPU, Memory etc.), these values propagate up the hierarchy in real time, affecting the Database/Health of the "database1" template and up to the "MyWebApp1" resource. The "SumMem" rule of the "MyWebApp1" will sum the "Memory" event-based rules of all its Process children (in this case the sum of the Memory rules of "database1" and "dnsprocess1"). The "AppStatus" rule in "MyWebApp1" will then be updated to reflect the new "SumMem" value along with the "Max CPU" and "Avg DB" rules, to provide a high level health metric of the application that can be presented in a scorecard or other visual tool.

Figure 9:
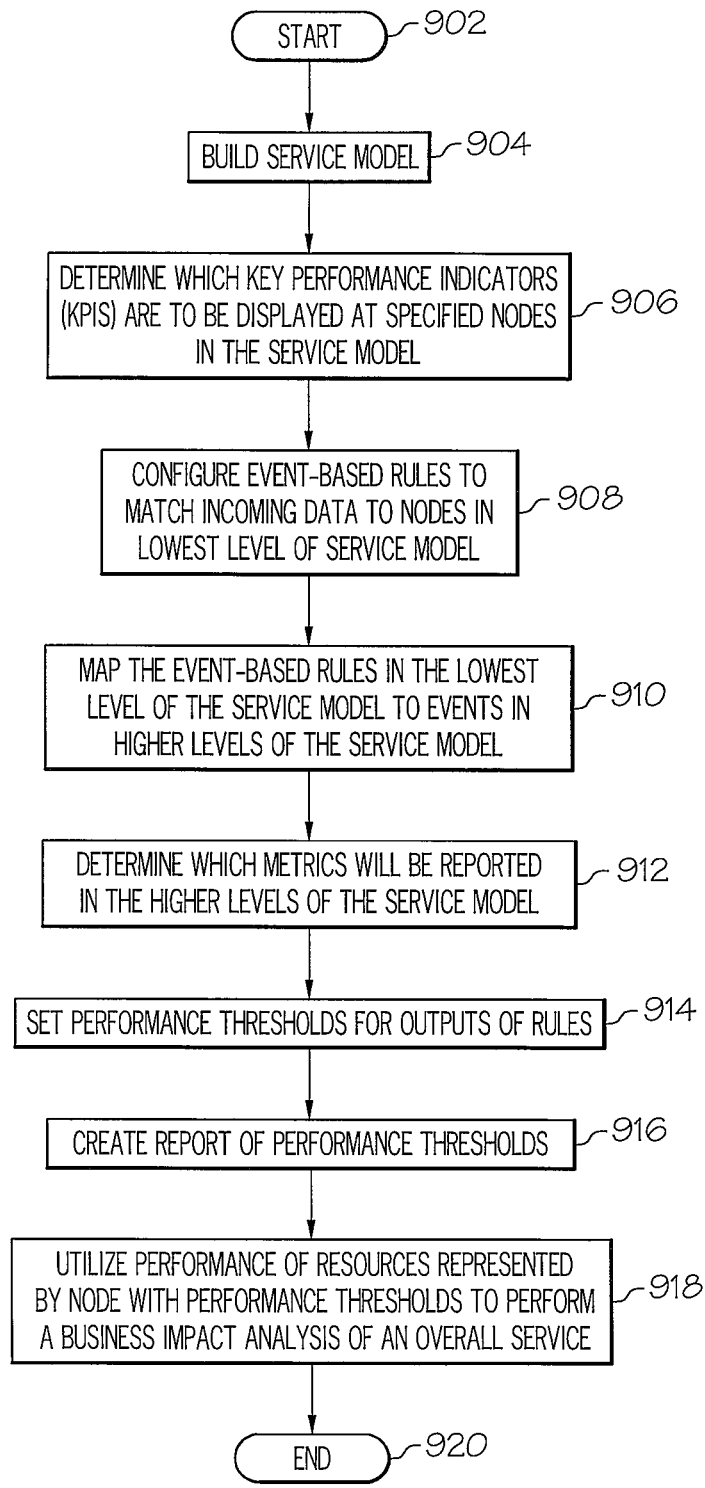
FIG. 9 is a flow-chart of exemplary steps taken to perform a business impact analysis based on the KPIs of the resources depicted in the service model.

Referring now to FIG. 9, a flow-chart of exemplary steps taken to promulgate rules through a service model is presented. After initiator block 902, an initial framework of a service model is built (block 904), preferably in a manner described above. After building the initial framework of the service model, a determination is made, by a user or by software logic, as to which Key Performance Indicators (KPIs) are to be associated with and ultimately displayed on specific nodes (which represent resources) in the service model (block 906). For example, assume that a particular node represents a server. KPIs that may be associated with that server may include processing speed time, CPU usage, memory demands, etc.

As shown in block 908, event-based rules are matched to incoming data at nodes at any level in the service model for which there are raw data inputs (events) available. For example, assume that a particular resource (e.g., a CPU) utilizes data (scalars) from a particular data storage unit (e.g., a hard disk drive). An event-based rule that matches this type of data, and the rate at which the data is received, is configured for a given template, and any number of resources can now be associated with this event-based rule by assigning the resources to the template.

As described in block 910, the event-based rules are then fed into other rules, including intra-resource rules within the same resource node in the service model, as well as inter-resource rules located in resource nodes that are at higher levels (are above, and thus utilize the lower depicted resources) in the service model. A determination is made as to which metrics will be reported in these higher-level nodes (block 912). These reported metrics (e.g., scalar outputs from rules within the higher-level nodes) may be presented in graphical form in the service model (such as shown in FIG. 7), or in tablature form (such as shown in FIG. 8). Threshold standards (KPIs) are set for the outputs of the rules in the nodes (block 914), and a report is created (block 916). This report can be a simple representation of some or all of the service model (e.g., as shown in FIG. 7), or the report can be a detailed analysis, in tablature, text, graphic or combination format.

Based on the created report and/or the representations of the resources in the service model and/or charts, a business impact analysis can then be performed (block 918). This business impact analysis determines how the resources are affecting the overall delivery of service using the resources described by the nodes, rules and KPIs as described above. Depending on this analysis, a determination can be made as to whether such services meet the requirements of a Service Level Agreement (SLA) between a service provider and a customer, if more or less maintenance of resources is required, etc. The process ends at terminator block 920.

Note that the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method for configuring Key Performance Indicators (KPIs) in a service model, the method comprising:
   constructing the service model, by a processor, such that the service model depicts multiple resources;
   assigning, by the processor, a first KPI to a first depicted resource in the service model;
   assigning, by the processor, a second KPI to a second depicted resource in the service model;
   chaining, by the processor, the first KPI to the second KPI; and
   visually coding the service model, by the processor, to indicate a status of the second depicted resource and a status of the first depicted resource.

2. The method of claim 1, further comprising:
   performing a business impact analysis of resources depicted in the service model based upon how one or more of the depicted resources performs when scored against one or more assigned KPI thresholds.

3. The method of claim 1, wherein a customizable policy logic is written by a user to provide additional flexibility in determining the status of the multiple depicted resources in accordance with their respective KPIs.

4. The method of claim 3, wherein the customizable policy logic receives a plurality of KPIs as inputs.

5. The method of claim 3, wherein the customizable policy logic receives, as inputs, responses to dynamic queries to external databases for performing KPI computations.

6. The method of claim 1 wherein the first KPI can access any properties configured on the resources to perform KPI calculations.

7. The method of claim 2, further comprising:
   scheduling maintenance of one or more of the depicted resources according to the business impact analysis.

8. The method of claim 2, wherein the business impact analysis determines if one or more terms of a Service Level Agreement (SLA) for maintaining the resources depicted in the service model have been met, wherein the SLA comprises a time-based performance threshold.

9. The method of claim 1, wherein the performance of the first KPI is based on incoming data to affect the first depicted resource.

10. The method of claim 1, wherein a template of the service model comprises a set of rules that defines a dependency relationship between two or more of the depicted resources.

11. The method of claim 1, wherein each service model template comprises a set of rules that map each of the depicted resources to one or more external data sources.

12. The method of claim 1, further comprising:
quantifying real-time characteristics of the depicted resources to create a performance score that describes a health of a total system that utilizes the depicted resources.

13. The method of claim 1, wherein the selected service model is managed by a service provider, and wherein at least part of the selected service model depicts computing resources of a customer of the service provider.

14. The method of claim 13, wherein the service model is constructed based on one or more external data sources, and wherein at least one of the external data sources is a Configuration Management Database (CMDB) that is directly managed by the customer.

15. The method of claim 14, wherein data from the CMDB is obtained by Structured Query Language (SQL) queries to the CMDB.

16. The method of claim 1, further comprising:
depicting the first KPI and the second KPI in the service model;
assigning a first KPI threshold to the first KPI and a second KPI threshold to the second KPI;
visually coding the first KPI to represent the first KPI's performance relative to the first KPI threshold; and
visually coding the second KPI to represent the second KPI's performance relative to the second KPI threshold.

17. The method of claim 1, further comprising:
presenting a table that represents the first depicted resource's performance relative to a first performance threshold and the second depicted resource's performance relative to a second performance threshold.

18. The method of claim 1, wherein one or more of the depicted resources are assigned to multiple service model templates.

19. A data processing apparatus comprising:
a CPU processor;
a storage device associated with the CPU processor for a plurality of service model templates;
a service model construction logic operable on the CPU processor, wherein the service model construction logic comprises:
receiving logic for receiving an input that selects one of the service model templates for construction of a selected service model, wherein the selected service model represents real-time characteristics of multiple depicted resources;
data source identification logic for identifying external data sources that are used to describe the real-time characteristics of the multiple depicted resources; and
construction logic for constructing the service model using the identified external data source;
a Key Performance Logic (KPI) for assigning a first KPI to a first depicted resource in the service model;
a rule propagation logic for:
assigning a second KPI to a second depicted resource in the service model;
chaining the first KPI to the second KPI; and
a visual coding logic for visually coding the service model to indicate a status of the second depicted resource and a status of the first depicted resource.

20. A computer program product for configuring Key Performance Indicators (KPIs) in a service model, the computer program product comprising:
a computer usable storage medium device having computer usable program code embodied therewith, the computer usable program code configured to be executed on a computer, the computer usable program code comprising:
computer usable program code configured for presenting a plurality of service model templates;
computer usable program code configured for receiving an input that selects one of the service model templates for construction of a selected service model, wherein the selected service model represents real-time characteristics of multiple depicted resources;
computer usable program code configured for identifying external data sources that are used to describe the real-time characteristics of the multiple depicted resources;
computer usable program code configured for constructing the service model using the identified external data sources;
computer usable program code configured for assigning a first KPI to a first depicted resource in the service model;
computer usable program code configured for assigning a second KPI to a second depicted resource in the service model;
computer usable program code configured for chaining the first KPI to the second KPI; and
computer usable program code configured for visually coding the service model to indicate a status of the second depicted resource and a status of the first depicted resource.

* * * * *